US006852158B2

(12) United States Patent
Belmont et al.

(10) Patent No.: US 6,852,158 B2
(45) Date of Patent: Feb. 8, 2005

(54) METHOD FOR ATTACHMENT OF ONE OR MORE ORGANIC GROUPS ONTO A PARTICLE

(75) Inventors: James A. Belmont, Acton, MA (US); Wayne Devonport, Doylestown, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/401,130

(22) Filed: Mar. 27, 2003

(65) Prior Publication Data

US 2004/0007161 A1 Jan. 15, 2004

Related U.S. Application Data

(60) Provisional application No. 60/368,053, filed on Mar. 27, 2002, and provisional application No. 60/368,056, filed on Mar. 27, 2002.

(51) Int. Cl.[7] ............................................. C09C 1/04
(52) U.S. Cl. ..................... 106/499; 106/429; 106/447; 106/465; 106/472; 106/473; 106/474; 106/475; 106/476; 106/491
(58) Field of Search ................. 106/429, 447, 106/465, 472, 473, 474, 475, 476, 491, 499

(56) References Cited

U.S. PATENT DOCUMENTS

| | | | |
|---|---|---|---|
| 3,043,708 A | 7/1962 | Watson et al. ............. | 106/307 |
| 3,479,300 A | 11/1969 | Rivin et al. ................ | 252/430 |
| 5,554,739 A | 9/1996 | Belmont ..................... | 534/885 |
| 5,698,016 A | 12/1997 | Adams et al. .............. | 106/316 |
| 5,707,432 A | 1/1998 | Adams et al. .............. | 106/31.6 |
| 5,747,563 A | 5/1998 | Flenniken et al. .......... | 523/215 |
| 5,803,959 A | 9/1998 | Johnson et al. ........... | 106/31.75 |
| 5,851,280 A | 12/1998 | Belmont et al. ............ | 106/472 |
| 5,885,335 A | 3/1999 | Adams et al. .............. | 106/31.6 |
| 5,895,522 A | 4/1999 | Belmont et al. ........... | 106/31.6 |
| 5,900,029 A | 5/1999 | Belmont et al. ............... | 8/550 |
| 5,922,118 A | 7/1999 | Johnson et al. ............ | 106/31.6 |
| 5,955,232 A | 9/1999 | Little et al. ................. | 430/106 |
| 6,017,980 A | 1/2000 | Wang et al. ................ | 523/215 |
| 6,042,643 A | 3/2000 | Belmont et al. ............ | 106/472 |
| 6,068,688 A | 5/2000 | Whitehouse et al. ..... | 106/31.65 |
| 6,103,380 A | 8/2000 | Devonport ................. | 428/403 |
| 6,110,994 A | 8/2000 | Cooke et al. ............... | 523/215 |
| 6,150,453 A | 11/2000 | Mahmud et al. ........... | 524/492 |
| 6,336,965 B1 | 1/2002 | Johnson et al. ............ | 106/31.6 |
| 6,337,358 B1 | 1/2002 | Whitehouse et al. ....... | 523/200 |
| 6,350,519 B1 | 2/2002 | Devonport ................. | 428/403 |
| 6,368,239 B1 | 4/2002 | Devonport et al. ...... | 473/449.2 |
| 6,458,458 B1 | 10/2002 | Cooke et al. ............... | 428/407 |
| 6,472,471 B2 | 10/2002 | Cooke et al. ............... | 525/165 |
| 6,478,863 B2 | 11/2002 | Johnson et al. ............ | 106/31.6 |
| 6,494,943 B1 | 12/2002 | von Gottberg et al. .. | 106/31.65 |
| 6,494,946 B1 | 12/2002 | Belmont et al. ............ | 106/472 |
| 6,534,569 B2 | 3/2003 | Belmont et al. ............ | 523/333 |
| 6,551,393 B2 | 4/2003 | Devonport et al. ........ | 106/31.6 |

FOREIGN PATENT DOCUMENTS

WO  WO 96/18696  6/1996  ........... C09D/11/02

*Primary Examiner*—Anthony J. Green

(57) ABSTRACT

A method of attaching one or more organic groups onto a particle is described which involves reacting at least one radical with at least one particle wherein the radical is generated from the interaction of at least one transition metal compound with at least one organo-halide compound in the presence of one or more particles capable of radical capture. Variations of this method are also described.

47 Claims, No Drawings

METHOD FOR ATTACHMENT OF ONE OR MORE ORGANIC GROUPS ONTO A PARTICLE

This application claims the benefit under 35 U.S.C. §119(e) of prior U.S. Provisional Patent Application No. 60/368,053, filed Mar. 27, 2002, and 60/368,056, filed Mar. 27, 2002, which are incorporated in their entirety by reference herein.

BACKGROUND OF THE INVENTION

The present invention relates to particles having attached organic groups, and more particularly, the present invention relates to methods of attaching one or more organic groups onto different types of particles.

Much effort has been expended over the last several decades to modify the surface chemistry of carbon black. While it is possible to deposit physically adsorbed material onto the surface of carbon black, permanently changing the surface chemistry of carbon black is substantially more difficult.

Some processes for chemically changing the surface of carbon black are known and used commercially. For example, it is well known that a carbon black surface can be oxidized with a variety of treating agents. Surface oxidation is used to make some commercial products. Sulfonation using sulfuric acid or chlorosulfuric acid and halogenation of a carbon black surface are also known. Some known methods for grafting polymers to the carbon black surface are reviewed by Tsubakowa in Polym. Sci., Vol. 17, pp 417–470, 1992. U.S. Pat. No. 4,014,844 relates to the grafting of polymers onto carbon black by contacting the carbon black with the polymer and heating.

U.S. Pat. No. 3,479,300 describes carbon catalyst compositions and a process for their production. The catalyst compositions are prepared by treating carbon particles with an alkali or alkaline earth metal and subsequently treating the resulting carbon/metal composition with a solvating ether. The carbon portions of the catalytic compositions can be reacted with various reagents, including organic compounds, to produce carbon compositions.

U.S. Pat. No. 3,043,708 describes modified carbon blacks having hydrocarbon groups chemically attached to the surface of the carbon black. The modified carbon blacks are prepared by reacting carbon black with an alkylating agent in the presence of a Friedel-Crafts type reaction catalyst. The hydrocarbon groups which reportedly can attach to the surface of the carbon black include aliphatic and aromatic groups. A modified carbon black containing aryl groups attached to the surface of a carbon black is reported as being preparable by reacting a halogenated carbon black with an aromatic hydrocarbon in the presence of a Friedel-Crafts type catalyst. U.S. Pat. No. 3,025,259 describes rubber compositions containing the modified carbon blacks of U.S. Pat. No. 3,043,708.

U.S. Pat. No. 3,335,020 describes modified carbon blacks where the carbon black is treated with benzene which is then polymerized on the carbon black. To prepare these modified carbon blacks, benzene and carbon black are mixed with a Lewis Acid catalyst under anhydrous conditions for about ten minutes. The benzene on the carbon black is then polymerized to parapolyphenyl by means of a combination co-catalyst-oxidizing agent and is reportedly thereby bonded to the carbon black.

U.S. Pat. Nos. 2,502,254 and 2,514,236 describe the manufacture of pigments containing carbon black. U.S. Pat. No. 2,502,254 reports that highly dispersed pigments suitable for mass pigmentation of viscose can be obtained by generating an azo pigment in the presence of carbon black. The pigment is produced by coupling a diazotized amine and another usual intermediate for a yellow, orange, or red pigment in the presence of carbon black in one or the other of the aqueous solutions of which the mixing brings about the coupling. U.S. Pat. No. 2,514,236 reports that this process can also prepare a chocolate brown pigment by coupling one molecular proportion of a tetrazotized benzidine with two molecular proportions of an arylmethyl pyrazolone in the presence of carbon black.

International Patent Application No. WO 92/13983 describes a process for modifying the surfaces of carbon-containing materials by electrochemical reduction of diazonium salts. The process is reportedly applicable, in particular, to carbon plates and carbon fibers for composite materials. Electrochemical reduction of diazonium salts containing certain functionalized aryl radicals to covalently modify carbon surfaces is also described in Delmar et al., *J. Am. Chem. Soc.* 1992, 114, 5883–5884.

According to WO 92/13983, the process for modifying the surface of a carbon-containing material consists of grafting an aromatic group to the surface of this material by electrochemical reduction of a diazonium salt including this aromatic group. The carbon-containing material is placed in contact with a diazonium salt solution in an aprotic solvent and is negatively charged with respect to an anode which is also in contact with the diazonium salt solution. Use of a protic solvent is reported to prevent the electrochemical process from producing the intended product as a result of reducing the diazonium triple bond to yield a hydrazine.

Carbon products and colored pigments having attached at least one organic group are described in U.S. Pat. Nos. 5,672,198, 5,571,311, 5,630,868, 5,707,432, 5,803,959, 5,554,739, 5,698,016, 5,713,988, WO 96/18688, WO 97/47697, and WO 97/47699. Various uses for these modified carbon products and pigments are described as well. All of these patents and publications are incorporated in their entirety by reference herein.

Despite the technology discussed above, there remains a need to modify the surface chemistry of carbon products and impart desired properties to the carbon products.

SUMMARY OF THE INVENTION

The present invention relates to methods of attaching one or more organic groups onto the surfaces of one or more particles. In general, the method involves reacting at least one radical with at least one particle capable of radical capture. In the method, the radical is generated by the interaction of a transition metal containing compound and an organo halide. This interaction preferably forms the radical in a reversible process. When the interaction between the halide and the metal compound generates the radical in relatively low concentrations, the formation of disproportionation products is advantageously reduced. The radical may be a carbon, silicon, nitrogen, phosphorous, sulfur, tin or selenium centered radical, and is preferably a carbon centered radical. Other types of radicals can be used. The radical is then trapped by the surface, giving a surface with an attached organic group.

The particles which are capable of having attached at least one organic group include, but are not limited to, carbon products such as carbon black, colored pigments, polymers, silica (e.g. with attached groups), metal oxides, metal carbonates, and combinations thereof.

It is to be understood that both the forgoing general description and the following detailed description are exemplary and explanatory and are intended to provide a further explanation of the present invention as claimed.

DETAILED DESCRIPTION OF THE PRESENT INVENTION

The present invention relates to methods of attaching one or more organic groups onto the surface of one or more particles. In general, the method involves reacting at least one radical with at least one particle capable of radical capture. In the method, the radical is generated by the interaction of a transition metal containing compound and an organo halide. This interaction preferably forms the radical in a reversible process. When the interaction between the halide and the metal compound generates the radical in relatively low concentrations, the formation of disproportionation products is advantageously reduced. The radical may be a carbon, silicon, nitrogen, phosphorous, sulfur, tin, or selenium centered radical, and is preferably a carbon centered radical. The radical is then trapped by the surface, giving a surface with an attached organic group. The present invention further relates to the products made from the methods of the present invention.

Any particle capable of radical capture can be used in the methods of the present invention. The particles which are capable of radical capture can have this capability due to the surface chemistry of the particle or through groups already attached onto the particle wherein these groups permit the radical capture. Examples of such particles include, but are not limited to, carbon products, colored pigments, polymers, silica preferably with attached groups, metal oxides and metal carbonates. Combinations of different types of particles can be used in the methods of the present invention.

Examples of carbon products, include, but are not limited to, carbon black, carbon fiber, carbon plates, activated carbon, vitreous carbon, charcoal, activated charcoal, graphite, and combinations thereof. The carbon may be of the crystalline or amorphous type and finely divided forms of the particles can be used.

Other carbonaceous material obtained by the pyrolysis of cellulosic, fuel oil, polymeric, or other precursors can be used. Additional examples, include, but are not limited to, carbon cloth, carbon aerogels, pyrolized ion exchange resins, pyrolized polymer resins, mesoporous carbon microbeads, pelleted carbon powder, nanotubes, buckyballs, silicon-treated carbon black, silica-coated carbon black, metal-treated carbon black, densified carbon black, carbon clad silica, alumina, and ceria particles, and combinations thereof or activated versions thereof. The carbonaceous material can also be a waste product or by-product of carbonaceous material obtained by pyrolysis.

In addition, the particle can be a colored pigment which optionally has an attached organic group. A wide range of conventional color pigments may be used in the present invention and include blue, brown, cyan, green, black, white, violet, magenta, red, yellow, as well as mixtures thereof. Specific examples of such pigments can be found in PCT publication WO 97/47699 and WO 01/10963 and as well as the *Colour Index,* Third Edition (The Society of Dyers and Colorists, 1982), all incorporated in their entirety by reference herein. [Industrial Organic Pigments, W. Herbst and K. Hunger, VCH Verlagsgesellschaft mbH, Weinheim, Germany, 1993] Specific examples include; anthraquinones, phthalocyanine blues, phthalocyanine greens, diazos, monoazos, pyranthrones, perylenes, heterocyclic yellows, quinacridones, and (thio)indigoids. Specific examples and further information concerning the colored pigments and methods of making colored pigments with attached aromatic groups or alkyl groups are described in PCT Publication Nos. WO 97/47699 and WO 01/10963, incorporated in its entirety by reference herein.

The particle can be a polymer. The polymer can be a thermoplastic polymer or a thermosetting polymer. Further, the polymer can be a homopolymer, copolymer, terpolymer, and/or a polymer containing any number of different repeating units. Further, the polymer present in the present invention can be any type of polymer, such as a random polymer, alternating polymer, graft polymer, block polymer, star-like polymer, and/or comb-like polymer. The polymer used in the present invention can also be one or more polyblends. The polymer can be an interpenetrating polymer network (IPN); simultaneous interpenetrating polymer network (SIN); or interpenetrating elastomeric network (IEN).

The silica, metal oxide, and metal carbonate particles which can be used in the methods of the present invention preferably have attached at least one organic group which is capable of capturing a radical. The silica can be of any type, including precipitated and amorphous silica. Similarly, the metal oxide can be any type, such as aluminum oxide, zinc oxide, titanium dioxide, and calcium carbonate.

Other particles which can be used in the methods of the present invention include silicon-treated carbon black which is an aggregate having a carbon phase and a silicon-containing species phase. Details of this silicon-treated carbon black can be found in U.S. Pat. Nos. 5,747,562, 5,622,557, WO 96/37547, and WO 98/13418. These patents and publications are incorporated in their entirety by reference herein. Another type of particle that can be used is a silica coated carbon black which is preferably partially coated with silica. A further description of this type of particle can be found in International Patent Application No. WO 98/13428.

Another type of particle that can be used is metal-treated carbon blacks which are aggregates having a carbon phase and a metal-containing species phase. Further details of this aggregate are set forth in U.S. Pat. No. 6,150,453, which is incorporated in its entirety by reference herein.

Organic groups can be attached to the silica and metal oxide prior to the reaction of the transition metal compound and the organohalide compound using compounds that include, but are not limited to, organosilanes, organotitanates or organozirconates. Specific examples of pretreating agents are 3-acryloxypropylmethyldimethoxysilane, 3-methacryloxypropyltrimethoxysilane, vinyltriethoxysilane.

Particles useful for the present invention may, for example, have primary particles sizes in the general range of from about 10 nm to about 800 nm or more, and preferably from about 10 nm to about 250 nm, and primary aggregate sizes in the general range of from about 50 nm to about 100 microns, preferably from about 50 nm to about 10 microns, still more preferably from about 75 nm to about 1 micron. The BET surface area of these particles can be any suitable surface area and preferably ranges from about 10 $m^2/g$ to about 2000 $m^2/g$ and more preferably, from about 10 $m^2/g$ to about 1,000 $m^2/g$, and still more preferably from about 50 $m^2/g$ to about 500 $m^2/g$; and the particle structure preferably ranges from about 10 cc/100 g to about 1000 cc/100 g, more preferably, from about 50 cc/100 g to about 200 cc/100 g.

The amount of the particles present during the reaction of the transition metal compound and organo-halide compound can be any amount and is preferably an amount which would permit uniform attachment of one or more organic groups onto each of the particles present during the reaction.

The organohalide may be a compound of the formula RX. R or R' (as described below) is an organic group and is preferably an alkyl group, an aralkyl group, a group of the formula $CH_2COOR'$, $CHR'COOR'$ or $CR'_2COOR'$ and is most preferably a benzylic group of the formula $ArCH_2$, $ArCHR'$, $ArCR'_2$, $Ar_2CH$ or $Ar_2CR'$. R' can also be hydrogen. R or R' may also be an aryl group, an alkaryl group or an acyl group. In more detail, R and R' can be an aliphatic group, a cyclic organic group, or an organic group having an aliphatic portion and a cyclic portion. R and R' may be substituted or unsubstituted, branched or unbranched. Aliphatic groups include, for example, groups derived from alkanes, alkenes, alkynes, alcohols, ethers, aldehydes, ketones, carboxylic acids, esters, nitriles, and carbohydrates. Cyclic organic groups include, but are not limited to, alicyclic hydrocarbon groups, for example, cycloalkyls, cycloalkenyls, heterocyclic hydrocarbon groups (for example, pyrrolidinyl, pyrrolinyl, piperidinyl, morpholinyl and the like) aryl groups, for example, phenyl, naphthyl, anthracenyl, and the like) and heteroaryl groups (imidazolyl, pyrazolyl, pyridinyl, thienyl, thiazolyl, furyl, indolyl, and the like). Ar is an aryl group. $Ar_2CH$ and $Ar_2CR'$ include substituted or unsubstituted fluorenyl groups. Further, specific examples of organic groups which can form the organo portion of the organo-halide are set forth in U.S. Pat. Nos. 5,672,198, 5,571,311, 5,630,868, 5,707,432, 5,803,959, 5,554,739, 5,698,016, 5,713,988, 6,534,569, 6,506,245, 6,494,946, 6,494,943, 6,478,863, 6,472,471, 6,458,458, 6,372,820, 6,368,239, 6,350,519, 6,337,358, 6,336,965, 6,258,864, 6,221,143, 6,218,067, 6,110,994, 6,103,380, 6,068,688, 6,054,238, 6,042,643, 5,977,213, 5,958,999, 5,955,232, 5,922,118, 5,900,029, 5,895,522, 5,885,335, 5,851,280, 5,830,930, 5,803,959, 5,725,650, 5,698,016, 5,630,868, WO 96/18688, WO 97/47697, and WO 97/47699. All of the patents and publications referenced above and herein elsewhere are incorporated in their entirety by reference herein. X is Br, Cl, F or I. When R is benzyl, X is preferably Cl or Br. When R is alkyl or aralkyl, X is preferably Br. When R is aryl, X is preferably I or Br.

The organohalide may be a compound of the formula X-Sp-[A]$_n$R", X-Sp-[POH]R", X-Sp-[Vinyl]R", or X-Sp-SMA. X is Br, Cl, F or I. Sp is a spacer group. Examples of Sp include, but are not limited to, —CR"$_2$CO$_2$—, —CR"$_2$CONR"—, —CH$_2$C$_6$H$_4$—, —CH$_2$Ar'—, —CH$_2$—, —CR"$_2$C$_6$H$_4$CH$_2$O$_2$C—, —CR"$_2$C$_6$H$_4$CH$_2$CO$_2$—, —CR"$_2$C$_6$H$_4$CH$_2$—, —CR"$_2$C$_6$H$_4$CH$_2$O—, —CR"$_2$C$_6$H$_4$CO$_2$—, and the like.

The group A represents an alkylene oxide group of from about 1 to about 12 carbons, p is an integer from 1 to 500, and R" represents hydrogen, a substituted or unsubstituted alkyl group, or a substituted or unsubstituted aromatic group. The group A can be the same or different when p is greater than 1. Examples of preferred alkylene oxide groups include, but are not limited to, —CH$_2$—CH$_2$—O—; —CH(CH$_3$)—CH$_2$—O—; —CH$_2$—CH(CH$_3$)—O—, —CH$_2$CH$_2$CH$_2$—O—, or combinations thereof.

The group POH represents a polyhydroxylated polymer such as polyvinyl alcohol, starch, or cellulose.

The group Vinyl represents an acrylic or styrenic homo- or copolymer comprising repeating substituted or unsubstituted acrylic or styrene monomer units. Some of these monomer units may comprise an ionic group, an ionizable group, or a mixture of ionic or ionizable groups. Examples of preferred Vinyl groups include homo- and copolymers of acrylic or methacrylic acid, homo- and copolymers of acrylic or methacrylic acid salts, homo- and copolymers of acrylic or methacrylic acid esters, styrene-acrylate polymers, sulfonated or carboxylated styrene-acrylic polymers, styrenic polymers, and ethylene-acrylic acid polymers.

The group SMA represents a styrene-maleic anhydride polymer or a derivative of a styrene-maleic anhydride polymer such as an ester, amide, imide, and a partially esterified or amidized material with a residual carboxylic acid group or salt thereof.

Examples of organo-halide compounds include, but are not limited to, 3-chloro benzyl bromide, chloroethanol, bromododecane, bromoacetic acid, 2-bromopropionic acid, 2-bromo-2-methylpropionic acid, propyl bromoacetate, bromohexene, 4-(chloromethyl) benzoic acid, N-(2-bromoethyl)phthalimide, 3-picolyl chloride, chloropropyltrimethoxy silane, poly(chloromethylstyrene), 2-chloroethanesulfonic acid, 2-bromoethanesulfonic acid, 2-chloroethylchloroformate, 4-chloro-1-butanol, α,α'-dibromo-p-xylene, 4-chlorobutylbenzoate, chlorobutyronitrile, 2-chloroethyl carbamate, 2-chloroethylphosphonic acid, 2-chloroethyltoluene sulfonate, 4-chloromethylphenyl isocyanate, 2'-bromoacetophenone, (4-bromobutyl) triphenylphosphonium bromide, bromobutyrolactone, 3-(bromomethyl)pyridine, 4-bromomethyl-N-methylpyridinium bromide.

Other halides that can be used for generation of radicals from the interaction with metal compounds have the formula RSO$_2$X, RSX, RNX$_2$, R$_2$NX, RP(O)X$_2$, R$_2$P(O)X, P(O)X$_3$, R(RO)P(O)X, (RO)$_2$P(O)X, R$_3$SiX, R$_2$SiX$_2$, R$_2$SiYX, RSiX$_3$, RSiYX$_2$, RSiY$_2$X, RSeX, R$_2$SeX$_2$, R$_3$SnX, R$_2$SnX$_2$, RSnX$_3$ where R is hydrogen, an alkyl group or an aryl group, X is Br, Cl, F, or I and Y is an alkoxy or aryloxy group. These compounds preferably generate sulfur, nitrogen, phosphorous, silicon, tin, or selenium based radicals by loss of X.

The transition metal compound is capable of reacting with the organohalide in order to release a radical. The radical is formed from the organo part of the organohalide by loss of the halide. The radical is preferably released reversibly. The transition metal in the transition metal compound will generally, but not necessarily, enter a higher oxidation state as a by product of the reaction with the organohalide compound. Examples of transition metals that can be used in the transition metal compound include Cu(I), Fe(II), Ru(I), Ru(II), Ni(II), Pd(II), Co(II), Cr(II), Cu(0), Ni(0), Fe(0), Pd(0), Pd(II), Rh(I), Rh(II), Cr(III). The transition metal compound preferably contains Cu(I) or Fe(II).

In addition, the transition metal compound can have at least one ligand as part of the transition metal compound. The ligands may be used to increase the solubility of the metal compound or to alter the reactivity of the metal compound. The ligands may be unidentate, bidentate, or polydentate, and may coordinate through N, P, O, S or C. Examples of such ligands include, but are not limited to, amines such as 2,2'bipyridine, dinonyl2,2'bipyridine, octyl amine, ethylene diamine, diethylene triamine, tetramethylethylene diamine, pentamethyldiethylene triamine, tris (dimethylaminoethyl)amine, phenanthroline, or an alkylpyridylmethanimine. The ligands may be phosphines such as triphenyl phosphine.

Examples of suitable transition metal compounds include, but are not limited to, CuClL, CuBrL, FeCl$_2$L, CuClL$_2$, CuBrL$_2$, FeCl$_2$L$_2$ wherein L is a bidentate ligand, such as 2,2' bipyridine. Other examples include compounds CuClL'$_n$, CuBrL'$_n$, wherein L' is a monodentate ligand, such as octylamine and n is an integer from 1 to 6 and the compounds NiBr$_2$L"$_2$, FeBr$_2$L"$_2$, CrBr$_3$L"$_2$ where L" is triphenylphosphine.

Metal compounds that are useful for metal catalyzed atom transfer polymerizations are useful in the present invention. These compounds include those described in WO 97/1824; 'Controlled Radical Polymerization' K. Matyjaszewski, ed., ACS Symposium Series 685, American Chemical Society, Washington, 1998 and all references therein. Preferred examples of such transition metal compounds are copper (I) bromide-2,2'-bipyridine complex, copper (I) chloride-2,2'-bipyridine complex, iron (II) chloride-triphenylphosphine complex, iron (II) bromide-triphenylphosphine complex, nickel (II) chloride-triphenyl phosphine complex, nickel (II) bromide-triphenyl phosphine complex, chromium (III) chloride-triphenylphosphine complex, chromium (III) bromide-triphenylphosphine complex, iron (II) chloride-tri (n-butylamine) complex and iron (II) bromide-tri(n-butylamine) complex.

When the transition metal compound reacts with the organohalide, the byproduct transition metal compound may contain a transition metal in an increased oxidation state. Although it is not necessary, it is optional to use a reducing agent that is capable of reducing the oxidation state of the transition metal in the byproduct transition metal compound. Such a reducing agent has a preferred effect of reducing the amount of transition metal compound necessary for the overall reaction. Examples of such reducing agents include, but are not limited to, sodium sulfite, stannous chloride, diimide, sodium dithionite, sodium hypophosphite, sodium dithionite and sodium hypophosphite. Preferred reducing agents are sodium oxalate and formic acid.

With respect to amounts of the various reactants used in the methods of the present invention, the transition metal compound is present in an amount to at least permit the attachment of at least one organic group onto at least one particle. Similarly, the organo-halide compound is present in a sufficient amount to at least permit the attachment of at least one organic group onto the particle. When compared to the surface area of the particle, the amount of transition metal compound present is preferably from about 0.01 umol/m$^2$ to about 5 umol/m$^2$, and more preferably from about 0.1 umol/m$^2$ to about 4 umol/m$^2$. When compared to the surface area of the particle, the amount of organo-halide compound present is preferably from about 0.01 umol/m$^2$ to about 5 umol/m$^2$, and more preferably from about 0.1 umol/m$^2$ to about 4 umol/m$^2$. Another manner in which these amounts can be characterized is with respect to the ratio of the amount of the transition metal compound to the amount of the organo-halide compound. Such ratios are from about 10:1 to about 1:100 and more preferably from about 1:1 to about 1:50. The amount of the reactants will vary depending upon the amount of organic groups that is to be attached onto the particle.

With respect to other reactant conditions, while any temperature above the freezing temperature of the reaction mixture can be used, it is preferred that the temperature of the reaction occur at temperatures of from about 0° to about 200° C., more preferably from about 20 to about 150° C., and most preferably from about 20° C. to about 100° C. The reaction is preferably carried out in the liquid phase. Solvents are preferably those in which the halide and/or metal complex have some solubility. Mixtures of solvents may be used and include, for example, water/alcohol blends. It is preferred that the reaction is carried out at a temperature below the boiling point of the solvent, but it would be possible to carry out the reaction at higher temperatures if a pressurized reaction vessel was used. Useful solvents include, but are not limited to, toluene, xylenes, water, and alcohols.

The reaction of the organohalide and metal complex with the particle may be carried out in air or under an inert atmosphere.

Furthermore, though not necessary, other optional ingredients can be included such as buffering agents, surfactants, antifoaming agents, dispersing agents, and accelerants. The amounts of these optional ingredients will be used in conventional amounts as with other reactions or can be readily determined in view of the goals as set forth and described in the present application.

More than one type of organic group can be attached to the particles and different types of particles can be used in the same reaction. Furthermore, the particles can be subjected to one reaction to attach one type of organic group and then subjected to another reaction to attach a second type of organic group, which can be the same or different from the first reaction onto the particle. All types of variations are possible.

The resulting product which is a particle having attached at least one organic group has many uses such as in inks, coatings, printing plates, black matrix/color filters, toners, elastomers, such as tires or components thereof, and the like as described in the patents set forth above. The particle having attached at least one organic group preferably has the organic group attached such that it cannot be removed by Soxhlet extraction. Preferably, the attachment is a chemical attachment such as a covalent bond. Also, the attachment can be through a molecule other than oxygen on the surface of the particle, such as a carbon-carbon type bond, and the like.

The present invention will be further clarified by the following examples, which are intended to be purely exemplary of the present invention.

EXAMPLES

CTAB surface areas were obtained using ASTM D-3765. DBPA data were obtained according to ASTM-D2414.

The materials were analyzed for chlorine by combustion.

Example 1

Preparation of a Carbon Product

A carbon black (10 g) with a CTAB surface area of 361 m$^2$/g and a DBPA of 117 mL/100 g was stirred with 1.44 g of copper (I) bromide, 3.12 g of 2,2' bipyridine and 100 mL of xylenes. After addition of 2.06 g of 4-chlorobenzyl bromide, the mixture was heated at reflux overnight under a nitrogen atmosphere. The carbon was removed by filtration and subjected to Soxhlet extraction with THF overnight and then with methanol for three days. The product was then washed with concentrated ammonium hydroxide until the washings were colorless. After drying, the product contained 1.44% chlorine, compared to 0.09% for the untreated carbon black and therefore contained 0.38 mmol/g chlorobenzyl groups.

Example 2

Preparation of a Carbon Product

A carbon black (10 g) with a CTAB surface area of 361 m$^2$/g and a DBPA of 117 mL/100 g was stirred with 1.44 g of copper (I) bromide, 2.06 g of 4-chlorobenzyl bromide and 100 mL of xylenes. After addition of 2.56 g of octyl amine, the mixture was heated at reflux for one hour under a nitrogen atmosphere. The carbon was removed by filtration and subjected to Soxhlet extraction with THF overnight and then with methanol for three days. The product was then washed with concentrated ammonium hydroxide until the washings were colorless. After drying, the product contained 0.50% chlorine, compared to 0.09% for the untreated carbon black and therefore contained 0.12 mmol/g chlorobenzyl groups.

Example 3

Preparation of a Carbon Product

A carbon black (10 g) with a CTAB surface area of 361 $m^2/g$ and a DBPA of 117 mL/100 g was stirred with 1.44 g of copper (I) bromide, 2.06 g of 4-chlorobenzyl bromide and 100 mL of xylenes. After addition of 1.29 g of octyl amine, the mixture was heated at reflux for five hours under a nitrogen atmosphere. The carbon was removed by filtration and subjected to Soxhlet extraction with THF overnight and then with methanol for three days. The product was then washed with concentrated ammonium hydroxide until the washings were colorless. After drying, the product contained 0.82% chlorine, compared to 0.09% for the untreated carbon black and therefore contained 0.21 mmol/g chlorobenzyl groups.

Example 4

Preparation of a Carbon Product

A carbon black (5 g) with a CTAB surface area of 361 $m^2/g$ and a DBPA of 117 mL/100 g was stirred with 5.57 g of Nickel bis(triphenylphosphine) dibromide, and 25 mL of toluene. After addition of 1.54 g of 4-chlorobenzyl bromide, the mixture was heated at reflux overnight under nitrogen. The carbon was removed by filtration and then washed with tetrahydrofuran (6×100 mL), and toluene (6×100 mL), concentrated ammonium hydroxide (4×25 mL), and 5N hydrochloric acid (3×25 mL. The product was subjected to Soxhlet extraction with water overnight. After drying, the product contained 1.14% chlorine, compared to 0.09% for the untreated carbon black and therefore contained 0.30 mmol/g chlorobenzyl groups.

Example 5

Preparation of a Carbon Product

A carbon black (5 g) with a CTAB surface area of 361 $m^2/g$ and a DBPA of 117 mL/100 g was stirred with 1.62 g of Iron (II) bromide, 3.93 g of triphenylphosphine, and 25 mL of toluene. After addition of 0.98 g of 4-chlorobenzyl bromide, the mixture was heated at reflux overnight under nitrogen. The carbon was removed by filtration and then washed with toluene (6×100 mL), concentrated ammonium hydroxide, and 5N hydrochloric acid (3×25 mL). The product was subjected to Soxhlet extraction with water overnight. After drying, the product contained 1.79% chlorine, compared to 0.09% for the untreated carbon black and therefore contained 0.48 mmol/g chlorobenzyl groups.

Example 6

Preparation of a Carbon Product

A carbon black (5 g) with a CTAB surface area of 361 $m^2/g$ and a DBPA of 117 mL/100 g was stirred with 2.19 g of Chromium (III) bromide, 3.93 g of triphenylphosphine, and 25 mL of toluene. After addition of 0.98 g of 4-chlorobenzyl bromide, the mixture was heated at reflux overnight under nitrogen. The carbon was removed by filtration and then washed with toluene (6×100 mL), concentrated ammonium hydroxide, and 5N hydrochloric acid (3×25 mL). The product was subjected to Soxhlet extraction with water overnight. After drying, the product contained 0.72% chlorine, compared to 0.09% for the untreated carbon black and therefore contained 0.18 mmol/g chlorobenzyl groups.

Example 7

Preparation of a Carbon Product

A carbon black (5 g) with a CTAB surface area of 361 $m^2/g$ and a DBPA of 117 mL/100 g was stirred with 1.17 g of Copper (I) bromide, 1.3 g of 2,2'-Bipyridine, and 20 mL of toluene. After addition of 1.7 g of 4-chlorobenzyl bromide, the mixture was heated at reflux overnight under nitrogen. The carbon was removed by filtration and then washed with toluene (6×100 mL), and concentrated ammonium hydroxide until washings were colorless. The product was subjected to Soxhlet extraction with THF overnight. After drying, the product contained 1.5% chlorine, compared to 0.09% for the untreated carbon black and therefore contained 0.40 mmol/g chlorobenzyl groups.

Example 8

Preparation of Carbon Products

Carbon black (5 g) with a CTAB surface area of 361 $m^2/g$ and a DBPA of 1117 mL/100 g was stirred with Copper (I) bromide, 2,2'-Bipyridine, 50 mL of a 7:3 water:isopropanol mixture and, in some cases, reducing agents. After addition of 1.03 g of 3-chlorobenzyl bromide, the mixture was heated at reflux overnight in air or under nitrogen. The carbon was removed by filtration and then washed with concentrated ammonium hydroxide until washings were colorless. The product was subjected to Soxhlet extraction with THF overnight, dried and analyzed for chlorine. The products had attached 3-chlorobenzyl groups.

| Example | CuBr g | Bipy-ridine g | Reducing agent | Reaction Time, Hr | Atmosphere | Attached groups, mmol/g |
|---|---|---|---|---|---|---|
| 8A | 0.72 | 2.34 | — | 1 | Air | 0.49 |
| 8B | 0.72 | 1.56 | — | 16 | Air | 0.40 |
| 8C | 0.72 | 0.78 | — | 16 | Air | 0.06 |
| 8D | 0.072 | 0.23 | — | 16 | Air | 0.24 |
| 8E | 0.072 | 0.23 | Potassium oxalate, 0.92 g | 16 | Air | 0.31 |
| 8F | 0.072 | 0.23 | Sodium formate, 0.34 g | 16 | Air | 0.36 |
| 8G | 0.72 | 2.34 | — | 16 | Air | 0.42 |
| 8H | 0.72 | 2.34 | — | 16 | Nitrogen | 0.46 |

Example 9

Preparation of a Carbon Product

A carbon black with a surface area of 200 $m^2/g$ and a DBPA of 117 mL/100 g was dried in a vacuum oven at 120° C. for two days. Xylenes were dried over molecular sieves for two days. The requisite glassware was dried at 150° C. and cooled under nitrogen. The carbon black (5 g) was stirred with 0.25 g of copper (I) chloride, 2.0 g of dinonyl 2,2'-bipyridine and about 50 mL of xylenes. After addition of 1.8 g of benzenesulfonyl chloride, the mixture was heated at reflux overnight under nitrogen. The product was removed by filtration, subjected to Soxhlet extraction with THF overnight and then subjected to Soxhlet extraction with methanol for two days. The product was then washed with concentrated ammonium hydroxide until the washings were colorless. Sulfur analysis showed that the product had more sulfur than the untreated carbon black and therefore had attached phenylsulfonyl groups.

Other embodiments of the present invention will be apparent to those skilled in the art from consideration of the specification and practice of the present invention disclosed herein. It is intended that the specification and examples be considered as exemplary only, with a true scope and spirit of the present being indicated by the following claims and equivalents thereof.

What is claimed is:

1. A method of making a particle having attached at least one organic group comprising reacting at least one radical with at least one particle wherein the radical is generated from the interaction of at least one transition metal compound with at least one organo-halide compound in the presence of one or more particles capable of radical capture of a radical.

2. The method of claim 1, wherein said particle is a carbon product.

3. The method of claim 2, wherein said carbon product is carbon black.

4. The method of claim 2, wherein said carbon product is carbon black, carbon fiber, activated carbon, vitreous carbon, nanotubes, charcoal, activated charcoal, graphite, or combinations thereof.

5. The method of claim 1, wherein said particle is silica having attached at least one organic group.

6. The method of claim 1, wherein said particle is a silica-coated carbon black, optionally having at least one organic group attached to the silica-coated carbon black.

7. The method of claim 1, wherein said particle is an aggregate comprising a carbon phase and a metal-containing species phase, optionally having at least oneorgmnic group attached to the aggregate.

8. The method of claim 1, wherein said particle is a metal oxide or metal carbonate having attached at least one organic group.

9. The method of claim 8, wherein said metal oxide or metal carbonate is aluminum oxide, zinc oxide, titanium dioxide, magnesium oxide, calcium carbonate.

10. The method of claim 1, wherein said particle is a colored pigment.

11. The method of claim 1, wherein said organo-halide compound has the formula RX and R is an organic group and X is Br, Cl, F, or I.

12. The method of claim 11, wherein R is a beozylic group of the formula $ArCH_2$, $ArCHR'$, $ArCR'_2$, $Ar_2CH$ or $Ar_2CR'$ and Ar is an aryl group and R' is an organic group.

13. The method of claim 11, wherein R is alkyl.

14. The method of claim 11, wherein R is aryl.

15. The method of claim 11, wherein R is alkyaryl or arylalkyl.

16. The method of claim 1, wherein said organohalide compound has the formula $RSO_2X$, $RSX$, $RNX_2$, $R_2NX$, $RP(O)X_2$, $R_2P(O)X$, $P(O)X_3$, $R(RO)P(O)X$, $(RO)_2P(O)X$, $R_3SiX$, $R_2SiX_2$, $R_2SiYX$, $RSiX_3$, $RSiYX_2$, $RSiY_2X$, $RSeX$, $R_2SeX_2$, $R_3SnX$, $R_2SnX_2$, $RSnX_3$ where R is hydrogen, an alkyl group or an aryl group, X is Br, Cl, F, or I, and Y is an alkoxy or aryloxy group.

17. The method of claim 1, wherein said organohalide has an organo portion which is an aliphatic group, a cyclic organic group, or an organic group having an aliphatic portion and a cyclic portion.

18. The method of claim 1, wherein the transition metal in said transition metal compound is capable of changing from a lower oxidation state to a higher oxidation state.

19. The method of claim 1, wherein said transition metal compound contains a metal selected from Cu(I), Fe(II), Ru(I), Ru(II), Ni(II), Pd(II), Co(II), Cr(II), Cu(0), Ni(0), Fe(0), Pd(0), Pd(II), Rh(I), Rh(II), or Cr(III).

20. The method of claim 1, wherein said transition metal compound contains Cu(I) or Fe(II).

21. The method of claim 1, wherein said transition metal compound is present in an amount of from about 0.01 $mmol/m^2$ to about 5 $mmol/m^2$ and said organo-halide compound is present in an amount of from about 0.01 $mmol/m^2$ to about 5 $mmol/m^2$ when compared to the surface area of the particle.

22. The method of claim 1, wherein said transition metal compound further comprises at least one ligand.

23. The method of claim 22, wherein said at least one ligand is 2,2'bipyridine, dinonyl2,2'bipyridine, octyl amine, ethylene diamine, diethylene triamine, tetramethylethylene diamine, pentamethyldiothylene triamine, tris (dimethylaminoethyl)amine, phenanthroline, an alkylpyridylmethanlinine or triphenyl phosphine.

24. The method of claim 22, wherein said at least one ligand is 2,2'bipyridine or dinonyl2,2'bipyridine.

25. The method of claim 1, further comprising at least one reducing agent capable of reducing the transition metal compound during the reacting of the at least one transition metal compound with the at least one organo-halide compound.

26. The method of claim 1, wherein said reacting occurs at a temperature of from about 20° C. to about 200° C.

27. The particle having attached at least one organic group resulting from the method of claim 1.

28. The particle having attached at least one organic group resulting from the method of claim 2.

29. The particle having attached at least one organic group resulting from the method of claim 3.

30. The particle having attached at least one organic group resulting from the method of claim 4.

31. The particle having attached at least one organic group resulting from the method of claim 5.

32. The particle having attached at least one organic group resulting from the method of claim 6.

33. The particle having attached at least one organic group resulting from the method of claim 7.

34. The particle having attached at least one organic group resulting from the method of claim 8.

35. The particle having attached at least one organic group resulting from the method of claim 9.

36. The particle having attached at least one organic group resulting from the method of claim 10.

37. The particle having attached at least one organic group resulting from the method of claim 11.

38. The particle having attached at least one organic group resulting from the method of claim 12.

39. The particle having attached at least one organic group resulting from the method of claim 13.

40. The particle having attached at least one organic group resulting from the method of claim 14.

41. The particle having attached at least one organic group resulting from the method of claim 15.

42. The particle having attached at least one organic group resulting from the method of claim 16.

43. The particle having attached at least one organic group resulting from the method of claim 17.

44. The method of claim 16, wherein said organohalide compound has the formula $RSO_2X$.

45. A method of making a carbon product having attached at least one organic group comprising reacting at least one radical with at least one carbon product wherein the radical is generated from the interaction of at least one transition metal compound with at least one organo-halide compound in the presence of a carbon product capable of radical capture of a radical.

46. The method of claim 45, wherein said carbon product is carbon black, carbon fiber, carbon plate, activated carbon, vitreous carbon, nanotubes, charcoal, activated charcoal, graphit, or combinations thereof.

47. The carbon product having attached at least one organic group resulting from the method of claim 45.

* * * * *